Nov. 19, 1940.   R. A. HEALD   2,222,313
OFFSETTING ARRANGEMENT FOR BORING TOOLS AND THE LIKE
Filed May 14, 1937
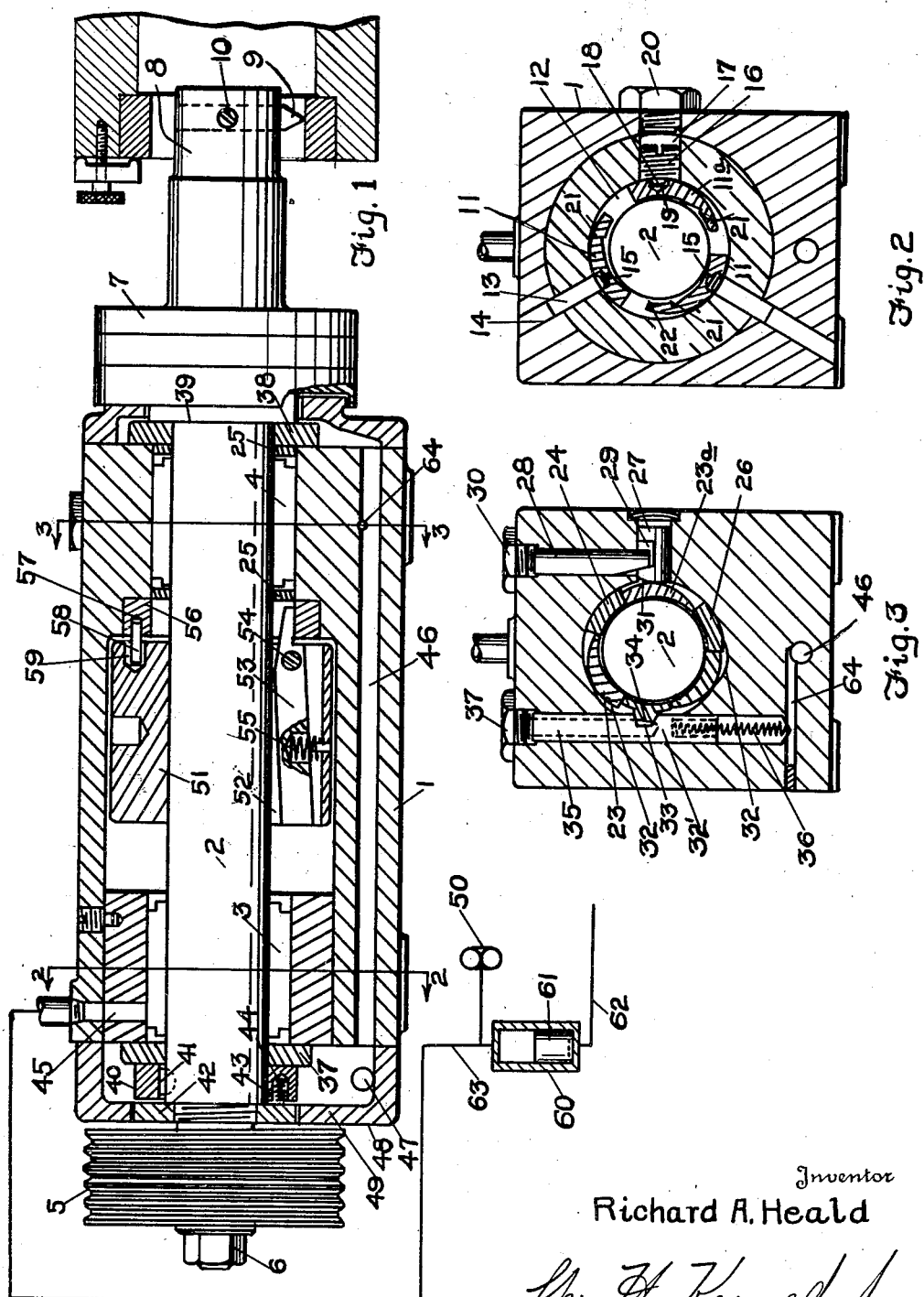
Inventor
Richard A. Heald
By Geo. H. Kennedy Jr.
Attorney Patented Nov. 19, 1940

2,222,313

UNITED STATES PATENT OFFICE 2,222,313

OFFSETTING ARRANGEMENT FOR BORING TOOLS AND THE LIKE

Richard A. Heald, Worcester, Mass., assignor to The Heald Machine Company, Worcester, Mass., a corporation of Massachusetts Application May 14, 1937, Serial No. 142,673

5 Claims. (Cl. 77—3)

The present invention relates to an arrangement by which a rotary spindle such as used for boring, grinding and like operations may be offset in varying amounts at the conclusion of such operation, so that upon withdrawal of the tool from the workpiece bore, the tool will be radially spaced from the workpiece surface and will leave no mark thereon.

In many boring machines the axis of the boring bar or spindle is in fixed radial relation to the axis of the workpiece; thus when the tool is withdrawn from the workpiece bore the tool leaves a spiral scratch or score in the finished surface, if the spindle is rotating, or a straight score or groove parallel to the axis of the workpiece if the spindle is not rotating. This spiral or straight score being extremely small in cross-section does not ordinarily affect the utility of the workpiece, but in certain instances does decrease the salability thereof by reason of its appearance.

Several arrangements have been developed for avoiding the formation of this groove during the withdrawal of the boring or other tool, one example of an arrangement of this character being shown in the Schmidt Patent No. 2,058,359, in which the tool in the end of the rotating boring spindle is radially retracted relative to the axis of rotation thereof when the spindle is stopped. This arrangement is entirely satisfactory for all types of boring operations where the machine has a provision for automatically stopping the spindle rotation before withdrawal of the spindle from the workpiece bore. The present invention provides another arrangement by which the boring or other tool may be retracted from operative position automatically by stopping the spindle rotation, and provides a relatively simple construction for obtaining a positive tool retraction of appreciable amount.

Where the workpiece is mounted for rotation and the cutting tool held in fixed position radially of the workpiece, as in the turning of the outer surfaces of workpieces, or in the boring of relatively large diameter bores, a relative radial movement between the tool and the workpiece for preventing marring of the finished work surface during axial withdrawal of the tool is desirable. To obtain this relative radial shifting movement the spindle carrying the workpiece is, by utilizing the structure of the present invention, shifted laterally of the spindle housing, thus shifting the workpiece on the end of the spindle away from the cutting tool. This same arrangement is equally effective in internal grinding machines for procuring a back-off of the wheel relative to the workpiece, this back-off resulting from the incorporation of the structure of the present invention in either the wheelhead or the workhead.

Rocking shoe bearings have previously been used for support of rotating spindles, as shown, for example, in the Haas Patent No. 2,072,814. Bearings of this type are adjusted to provide a space between the spindle surface and the rocking shoe so that during rotation of the spindle a wedge-shaped film of oil may be built up between each of the rocking shoes and the bearing surface on the spindle. When the spindle is not rotating, the lubricant is not carried in between the rocking shoes and the spindle so that the pressures built up between each of the rocking shoes and the spindle surface are greatly reduced; thus with the lubricant pressure relieved, each of the rocking shoes, because of such space or clearance, is permitted to rock freely, under any radial force exerted on the spindle thus causing the spindle to be moved slightly away from its normal position of rotation. The present invention takes advantage of this available displacement for procuring a lateral shifting movement of the spindle in the housing for spacing the tool from the work.

One arrangement for procuring a lateral shifting movement of the spindle within the housing is shown in the copending Blood application Serial No. 135,968, filed April 9, 1937, and provides for shifting the spindle laterally of the housing by a spring which is rendered operative to shift the spindle laterally when the latter is brought to rest. The present invention provides an alternative arrangement for accomplishing more effectively this offsetting of the tool which is sought for by the arrangement of the Blood application. According to the present invention the arrangement is such that spindle portions which are relatively near to the tool are permitted to have a greater amount of lateral or offsetting movement than those portions relatively remote from the tool, thus insuring at all times a positive spacing of the point of the tool from the workpiece surface, as soon as the tool comes to rest.

Other and further objects and advantages of the invention will appear from the following detailed description taken in connection with the accompanying drawing in which—

Fig. 1 is a sectional view illustrating the invention as applied to a rotary spindle carrying a boring tool.

Fig. 2 is a sectional view along the line 2—2 of Fig. 1.

Fig. 3 is a sectional view along the line 3—3 of Fig. 1.

Like reference characters refer to like parts in the different figures.

The illustrated embodiment of the invention is a boring head which is applicable to certain familiar types of boring machines, one example of which is disclosed in the Schmidt Patent No. 2,058,359. In machines of this character the base has ways supporting a reciprocating table or carriage, on which either the workpiece to be bored, or the boring head, is mounted, the other of these elements being mounted on a bridge secured to the base of the machine.

The travel of the table procures a relative axial movement between the workpiece and the boring tool for a boring operation on the workpiece and subsequently a withdrawal of the tool and spindle from within the workpiece bore by travel of the table in the opposite direction. Prior to reversal of the table movement, and after the boring tool has completed its action on the workpiece, the rotating boring spindle is stopped and the mechanism of the present invention then becomes automatically operative to procure a relative radial offsetting movement between the tool and the workpiece. The mechanism for stopping the spindle rotation is fully disclosed in the Schmidt patent above referred to and as it is not a feature of the present invention, will not be described in detail.

As shown in Fig. 1, the boring spindle mounting which illustrates one embodiment of the invention comprises a housing 1 having a spindle 2 journalled therein on suitable, axially spaced rocking shoe bearings 3 and 4, hereinafter described in detail. The spindle 2 has a pulley 5 at one end thereof, secured against rotation thereon by a suitable key, not shown, and by a clamping nut 6, to provide for rotation of the spindle from a driving motor on the base of the machine. On the other end of the spindle is mounted a cap 7 having an integral projecting stud 8 in axial alinement with the spindle 2. A boring tool 9 is mounted in the end of the stud 8 and projects radially therefrom. A provision is made for adjustment of the tool 9 within the end of the stud, and the tool is clamped in position by a suitable clamping screw 10. In certain instances the cap 7 may be integral with the spindle 2 and during the use of the boring head the cap 7 is functionally integral with the spindle.

With reference to Fig. 2, the set of rocking shoe bearings 3 at the end of the spindle adjacent to the pulley 5 comprises a plurality of rocking shoes 11 and 11a having their inner surfaces curved on a slightly greater radius of curvature than the radius of curvature of the periphery of the spindle 2. The outer surface of each shoe has a slightly smaller radius of curvature than the radius of curvature of the bore 12 of sleeve member 12' which is provided within the housing 1 to support and surround said shoes. Each of the shoes 11 is held in position by a locating pin 13 arranged in a suitable hole 14 extending through the member 12' and the housing 1, with the end of each pin engaging in a recess 15 in the outer surface of the shoe. The diameter of the recess 15 is slightly greater than the diameter of the pin 13, the latter preferably being tapered or rounded, as shown, so that the outer surface of each shoe may rest against the bore 12. Since the curvature of the shoes 11 is greater than the bore 12, the shoes have a line contact with the bore and may thus rock slightly during the rotation of the spindle.

The other shoe 11a is adjustable within the housing 1 by means of a threaded plug 16 located in a cross bore 17 of member 12'. The plug 16 has a projecting pin 18 engaging in a recess 19 in the rocking shoe 11a and the diameter of the pin 18 is such that the outer surface of the shoe may rest upon the end of the plug 16. The surfaces of the shoe 11a have curvatures corresponding to the curved surfaces of the shoes 11 and the outer surface of the shoe 11a thus has a line contact with the end of the plug 16 for a slight rocking movement of the shoe during the rotation of the spindle. A removable cap 20 may close the end of the bore 17. Each of the rocking shoes 11 and 11a, instead of having a continuous inner curved surface may provide a notch 21 in the inner surface thereof to increase the pressures developed in the wedge-shaped film of oil between each of the rocking shoes and the spindle, thus to obtain a more accurate positioning of the axis of rotation of the spindle. It will be noted that each notch 21 presents a surface having the same relation to the inner surface of the rocking shoe as the surface 22 at the leading edge of each shoe.

As shown in Fig. 3, the set of rocking shoes 4 at the opposite end of the spindle nearer the tool 9, comprises rocking shoes 23 and 23a uniformly spaced apart around the spindle by a cage 24. The cage is made up of spaced annular rings 25, Fig. 1, connected by angularly spaced bars 26 which form a cage having its outer periphery substantially equal to the diameter of the bore 1' of housing 1 receiving such cage. The inner surface of each rocking shoe 23 and 23a is curved on a slightly greater radius of curvature than the radius of curvature of the periphery of the spindle 2, as in the case of the rocking shoes 11 and 11a and the outer surface of each shoe has a slightly smaller radius of curvature than the radius of the curvature of the housing bore 1'. The cage 24 holds the shoes from being displaced angularly within the bore 1' by rotation of the spindle, and the shoes 23 rest against the bore 1' in the housing and rock thereon during the spindle rotation. The rocking shoe bearing 23a is adjustable by means of a plunger 27 slidable in a cross bore of the housing 1, and held in position by an adjustable pin 28, the inner beveled end of which engages in a notch 29 in the plunger. A cap 30 provides for adjustment of the pin 28 and thereby controls the position of the adjustable rocking shoe 23a.

The inner end of the plunger 27 has one side thereof cut away, as at 31, and the bore 1' adjacent the normal position of each of the rocking shoes 23, has recesses 32 therein to allow the shoes to space themselves away from the spindle when the cage 24 is turned, to shift said shoes angularly within the housing. The angular shifting movement of the shoes is obtained by a vertically slidable plunger 32' arranged in a vertical bore 65 of the housing and having a notch 33 engaged by a projection or tooth 34 integrally formed on one of the connecting bars 26. The notch 33 intersects an axial bore 35 extending from the upper end of the plunger 32'. A coil spring 36 is positioned in the bore 65 in which the plunger 32' is located and engages with the lower end of said plunger to hold the latter in the upper position shown. A cap 37 limits the upward movement of the plunger 32'.

In the normal operation of the spindle the rocking shoes 23 and 23a are in the position of Fig. 3, in which position they are free to rock by reason of the curved outer surfaces thereof to accommodate a wedge-shaped film of oil between each of the shoes and the spindle surface. To obtain a substantial amount of radial shifting movement of the spindle within the housing when the spindle rotation is stopped, the rocking shoes 23 and 23a are shifted angularly within the housing so that the shoes 23 may move away from the spindle by entering the grooves 32. At the same time the rocking shoe 23a may move outwardly since it is moved onto the cutaway portion 31 of the plunger 27.

Rocking shoe bearings of this character run in a bath of oil, which, in the present instance, is sealed within the housing by rings 37 and 38 at opposite ends of the bore. The ring 38 is engaged by a shoulder 39 on the spindle 2 and is held yieldingly against the end of the housing to close the end of the bore 1' by suitable spring devices (hereinafter described) which continually urge the entire spindle toward the left, Fig. 1. The ring 37 surrounds the spindle 2 at the left hand end of the bore 12, said ring being arranged between the member 12' and a collar 40 slidable on the spindle 2 and held against rotation thereon by a key 41. The spindle adjacent to the collar 40 is threaded to receive a threaded ring 42, whereby coil springs 43 located in recesses 44, angularly spaced in the collar 40, thrust outwardly against the ring 42, and tend to urge the entire spindle as a unit to the left, thereby holding the rings 37 and 38 against the opposite ends of the bore.

A channel 45 in the housing 1 provides for admission of oil to the interior of the housing to assure a sufficient supply of oil to the bearings. The housing also has a channel 46 connected to a drain 47 to carry off any oil leaking from the housing bore, past the rings 37 or 38. The drain 47 is located in a cap 48 secured to and functionally integral with the end of the housing 1, this cap having an inwardly extending flange 49 substantially flush with the periphery of the ring 42.

For the lubrication of the rocking shoe bearings, oil is fed by channel 45 into the housing under a suitable pressure, either by a gravity feed, or by connecting the channel 45 to an oil line 63 supplied by a pump 50. In any event the pressure on the lubricating oil is sufficient to obtain a satisfactory operation of the rocking shoe bearings.

As fully explained in the copending application of Blood, Serial No. 135,968, above referred to, the rocking shoe bearings support the spindle in such a manner that when the spindle is rotated the spindle will have a substantially fixed axis of rotation and there will be no appreciable lateral play of the spindle, owing to the wedge-shaped films of oil built up between each of the rocking shoes and the spindle during the spindle rotation. This function of rocking shoe bearings is well known, and as the operation of rocking shoe bearings is understood, and fully described as well in the Blood application above referred to, it need not be described in detail. It is also characteristic of rocking shoe bearings that when the spindle is at rest, lubricating oil is no longer wiped in between the shoes and the spindle and accordingly the large initial clearance between the spindle and rocking shoes is again established. With the spindle at rest, a radial offsetting movement of the spindle relative to its supporting structure can then take place. This lateral offsetting movement is used to obtain the desired spacing of the cutting tool from the surface of the workpiece bore, so that the ensuing axial withdrawal of the tool from said bore can occur without marring said surface.

With reference to Fig. 1, the structure by which the lateral shifting movement of the spindle is procured comprises a collar 51 secured against turning movement on the spindle, this collar being preferably arranged between the spaced sets of bearing shoes within the housing. The collar has a slot 52 therein in which is arranged a lever 53 pivoted on a pin 54 carried by the collar. A coil spring 55 normally urges one arm of the lever toward the axis of the spindle, and the opposite end of the lever is adapted for fulcruming engagement with a ring 56 rotatably received in a recess 57 in the housing and turnable as a unit with the collar 51 by means of a connecting pin 58. The recess 59 in the collar 51 which is engaged by the pin 58 is larger in diameter than the pin to provide for limited relative movement between the collar and ring. It will be noted that when the spindle is at rest the coil spring 55, acting on the lever 53, will rock the lever about the pin 54 whereby in view of the lever's engagement at its other end with the fixed member 56, the spring pressure will tend to shift the entire spindle and all parts carried thereby laterally, within the yieldable shoe bearings of said spindle. The lever 53 is located on the same side of the spindle as the point of the cutting tool, as shown in Fig. 1, so that the lateral shifting movement of the spindle will assure a radial movement of the cutting point of the tool toward the axis of rotation of the spindle.

Boring heads of this character are generally mounted on boring machines which provide for stopping the rotation of the boring spindle at the completion of the boring operation and prior to the withdrawal of the boring tool axially relative to the workpiece. Mechanism for controlling the spindle rotation is well known and is fully described in the Schmidt Patent No. 2,058,359, and as this mechanism is not a feature of the present invention, it need not be here described in detail. According to the present invention this mechanism used for stopping the spindle also provides for shifting the position of the rocking shoes at the tool end of the spindle to obtain at such tool end of the spindle, a greater amount of lateral shifting or offsetting movement, for the tool itself, by disposal of the spindle axis at an angle to its normal operating position, instead of parallel thereto as in the arrangement of the aforesaid Blood application. To this end a casing 60 having a plunger 61 therein is connected at one end to a conduit 62 from the brake cylinder which provides for stopping the spindle rotation. The other end of the casing is connected by a conduit 63 to the channel 45 and also to the source of lubricating oil 50. Thus, when fluid under pressure is directed to the brake mechanism for stopping the spindle rotation, the plunger 61 by its upward movement produces a pressure on the oil supply so that the oil is forced into the bore 35 of the plunger 32' through the notch 33 and thereby causes a downward movement of the plunger 32'. Downward movement of the plunger causes turning movement of the cage 24 so as to register the central portions of shoes 23 and 23a with the recesses 31 and 32, thus allowing the rocking shoes 23 and 23a to move outwardly away from the spindle. To prevent accumulation of fluid beneath the plunger 32' a small drain channel 64 intersects the lower end of the bore in which the plunger is positioned and communicates with the drain channel 46.

In use, the spindle when at rest is shifted laterally through the action of the lever 53 and the coil spring 55, the latter rocking the lever 53 clockwise. When the spindle is rotated, however, the weight of the lever 53 causes the lever to swing outwardly by centrifugal force against the action of the coil spring 55, thereby withdrawing the opposite end of the lever from engagement with the ring 56 to allow the spindle to assume its normal position of rotation. The spindle is held against lateral shifting movement during rotation by the well known action of the rocking shoe bearings 11 and 11a at one end thereof, and the bearings 23 and 23a at the opposite end thereof. When the spindle is brought to rest, the wedge-shaped oil film built up between each of the rocking shoes and the spindle is no longer maintained by the wiping in of lubricant between each of the shoes and the spindle so that the rocking shoes may assume a position which will allow the spindle to move laterally of the housing, and this lateral movement is effected by the action of the coil spring 55, as above pointed out.

Where a greater amount of lateral shifting movement of the spindle is desirable the hydraulic structure above described may be used, and in this event, when the brake mechanism for stopping the spindle rotation is energized, the piston 61 injects sufficient oil into the housing to cause the plunger 32' to move downwardly, thereby providing for an outward movement of all of the rocking shoe bearings 23 and 23a to allow the coil spring 55, acting through the lever 53, to shift the spindle laterally an even greater distance from its normal axis of rotation. It will be understood that when the brake mechanism is relieved, the piston 61 returns to its lower position and thereby decreases the pressure within the housing sufficiently to allow the spring 36 to return the plunger 32' to its upper position to reestablish the rocking shoes 23 and 23a in normal operative position.

From the foregoing it will be apparent that the present invention provides for an automatic lateral shifting of the spindle within the housing when the spindle is brought to rest, the same including an arrangement to obtain at the tool end of the spindle a relatively large shifting movement by spacing the bearing elements away from the spindle and out of their normal position. This arrangement is entirely automatic and becomes operative upon stopping of the spindle and inoperative when the spindle is rotating. Moreover, the present invention includes a special type of rocking shoe bearing by which to increase the pressure existing in the wedge-shaped film of oil between each rocking shoe and the spindle so that the spindle will be held securely against any lateral movement during the spindle rotation.

I claim:

1. In an arrangement of the class described, means for supporting a workpiece, a cutting tool for operation on said workpiece, a rotary spindle carrying one of said elements, a housing in which said spindle is journalled, rocking shoe bearings in the opposite ends of said housing for said spindle, said bearings permitting lateral movement or play of the spindle within the housing when the spindle is not rotating, means operable on the spindle when its rotation stops for shifting same laterally in said housing, and means operable on one of said bearings to relieve the support of its shoes, whereby said shifting means effects a greater offset of the spindle axis at one end of the housing than at the other end of said housing.

2. In an arrangement of the class described, means for supporting a workpiece, a cutting tool for operation on said workpiece, a rotary spindle carrying one of said elements, a housing in which said spindle is journalled, rocking shoe bearings in the opposite ends of said housing for said spindle, said bearings permitting lateral movement or play of the spindle within the housing when the spindle is not rotating, means operable on the spindle when its rotation stops for shifting same laterally in said housing, and means responsive to said spindle stoppage for relieving the support of the shoes of one of said bearings whereby said shifting means effects a greater offset of the spindle axis at one end of the housing than at the other end of said housing.

3. In a boring head, a housing, a spindle journalled in said housing, and projecting from one end thereof, said spindle having a boring tool on the projecting end thereof, bearings at opposite ends of the housing arranged to provide for a slight lateral play of the spindle when the latter is not rotating, means exerting a lateral pressure on the spindle for shifting the spindle laterally in the housing in the direction opposite to the projection of the tool from the spindle when the spindle is stopped, and means responsive to such spindle stoppage for relieving the support of the bearing nearest the tool, whereby said shifting means is enabled to shift said spindle to a position in which its axis stands at an angle to the rotating position of said spindle axis.

4. In a boring head, a housing, a spindle journalled in said housing, and projecting from one end thereof, said spindle having a boring tool on the projecting end thereof, bearings at opposite ends of the housing arranged to provide for a slight lateral play of the spindle when the latter is not rotating, means exerting a lateral pressure on the spindle for shifting the spindle laterally in the housing in the direction opposite to the projection of the tool from the spindle when the spindle is stopped, and fluid pressure means for relieving the support of the bearing nearest the tool, whereby said shifting means is enabled to shift said spindle to a position in which its axis stands at an angle to the rotating position of said spindle axis.

5. In an arrangement of the class described, a housing, a spindle therein having a laterally projecting tool, spaced rocking shoe bearings in said housing for said spindle, one bearing being nearer to said tool than the other, said bearings permitting lateral play of the spindle within the housing when the spindle rotation is stopped, a device carried by said spindle on the same side thereof as said tool for offsetting same laterally on stoppage of its rotation, said device being held inoperative by centrifugal force during rotation of said spindle, and means responsive to spindle stoppage for shifting said bearing nearest the tool to a position permitting greater lateral spindle movement by said offsetting device, than the movement permitted by said other bearing.

RICHARD A. HEALD.